(12) United States Patent
Stokeley

(10) Patent No.: US 11,636,759 B2
(45) Date of Patent: Apr. 25, 2023

(54) TRAFFIC RECORDING ASSEMBLY

(71) Applicant: Bobby Stokeley, Brookyln, NY (US)

(72) Inventor: Bobby Stokeley, Brookyln, NY (US)

( * ) Notice: Subject to any disclaimer, the term of this patent is extended or adjusted under 35 U.S.C. 154(b) by 143 days.

(21) Appl. No.: 17/203,071

(22) Filed: Mar. 16, 2021

(65) Prior Publication Data

US 2022/0301425 A1  Sep. 22, 2022

(51) Int. Cl.
| | |
|---|---|
| *G08G 1/017* | (2006.01) |
| *H04N 5/76* | (2006.01) |
| *G08G 1/054* | (2006.01) |
| *G08G 1/02* | (2006.01) |
| *G06V 20/56* | (2022.01) |

(52) U.S. Cl.
CPC ........... *G08G 1/0175* (2013.01); *G06V 20/56* (2022.01); *G08G 1/02* (2013.01); *G08G 1/054* (2013.01); *H04N 5/76* (2013.01)

(58) Field of Classification Search
CPC ........ G08G 1/0175; G08G 1/02; G08G 1/054; G06V 20/56; H04N 5/76
USPC ........................................................ 348/149
See application file for complete search history.

(56) References Cited

U.S. PATENT DOCUMENTS

| | | | |
|---|---|---|---|
| 4,278,962 A * | 7/1981 | Lin | ........................ G01S 15/931 340/904 |
| 6,734,787 B2 | 5/2004 | Ikeda | |
| 6,894,717 B2 | 5/2005 | Bakewell | |
| 7,183,944 B2 | 2/2007 | Gutta | |
| 7,248,149 B2 | 7/2007 | Bachelder | |
| D680,142 S | 4/2013 | Weiss | |
| 8,768,568 B2 | 7/2014 | Uhlmann | |
| 9,019,380 B2 | 4/2015 | Schenken | |
| 11,457,129 B2 * | 9/2022 | Grotto | .................. H04N 5/2253 |
| 2002/0186297 A1 * | 12/2002 | Bakewell | ............... G08G 1/054 348/118 |

FOREIGN PATENT DOCUMENTS

WO   WO2005036494   4/2005

* cited by examiner

*Primary Examiner* — John W Miller
*Assistant Examiner* — Omer Khalid

(57) ABSTRACT

A traffic recording assembly includes a plurality of recording units that is each positionable on an emergency vehicle. Each of the recording units can be directed toward oncoming traffic when the emergency vehicle is positioned on the side of a roadway to respond to an emergency. Each of the recording units has video recording capabilities to identify vehicles that are not following traffic laws as they pass the emergency vehicle. Additionally, each of the recording units emits electromagnetic energy to detect the speed of the oncoming traffic. A base unit is positioned within the emergency vehicle to store the video and to store the speed of the oncoming traffic for subsequent prosecution.

5 Claims, 5 Drawing Sheets

TRAFFIC RECORDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to recording devices and more particularly pertains to a new recording device for recording video footage and velocity of oncoming traffic with respect to an emergency vehicle that is responding to a vehicular emergency on a roadway. The device includes a plurality of video cameras and a plurality of radar speed detectors to facilitate subsequent prosecution of vehicles on the roadway that violate traffic laws as they pass the emergency vehicle.

(2) Description of Related Art Including Information Disclosed Under 37 CFR 1.97 and 1.98

The prior art relates to recording devices including a variety of traffic detection systems that incorporate video capture technology for capturing video footage of vehicles driving on public roadways. In several instances the video capture technology is employed to identify emergency vehicles for civilian drivers on the public roadways. In no instance does the prior art disclose a traffic recording device that includes a plurality of video cameras and a plurality of radar speed sensors, each being mounted to an emergency vehicle, thereby identifying vehicles that violate traffic laws as they pass the emergency vehicle when the emergency vehicle is parked on a side of a roadway.

BRIEF SUMMARY OF THE INVENTION

An embodiment of the disclosure meets the needs presented above by generally comprising a plurality of recording units that is each positionable on an emergency vehicle. Each of the recording units can be directed toward oncoming traffic when the emergency vehicle is positioned on the side of a roadway to respond to an emergency. Each of the recording units has video recording capabilities to identify vehicles that are not following traffic laws as they pass the emergency vehicle. Additionally, each of the recording units emits electromagnetic energy to detect the speed of the oncoming traffic. A base unit is positioned within the emergency vehicle to store the video and to store the speed of the oncoming traffic for subsequent prosecution.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
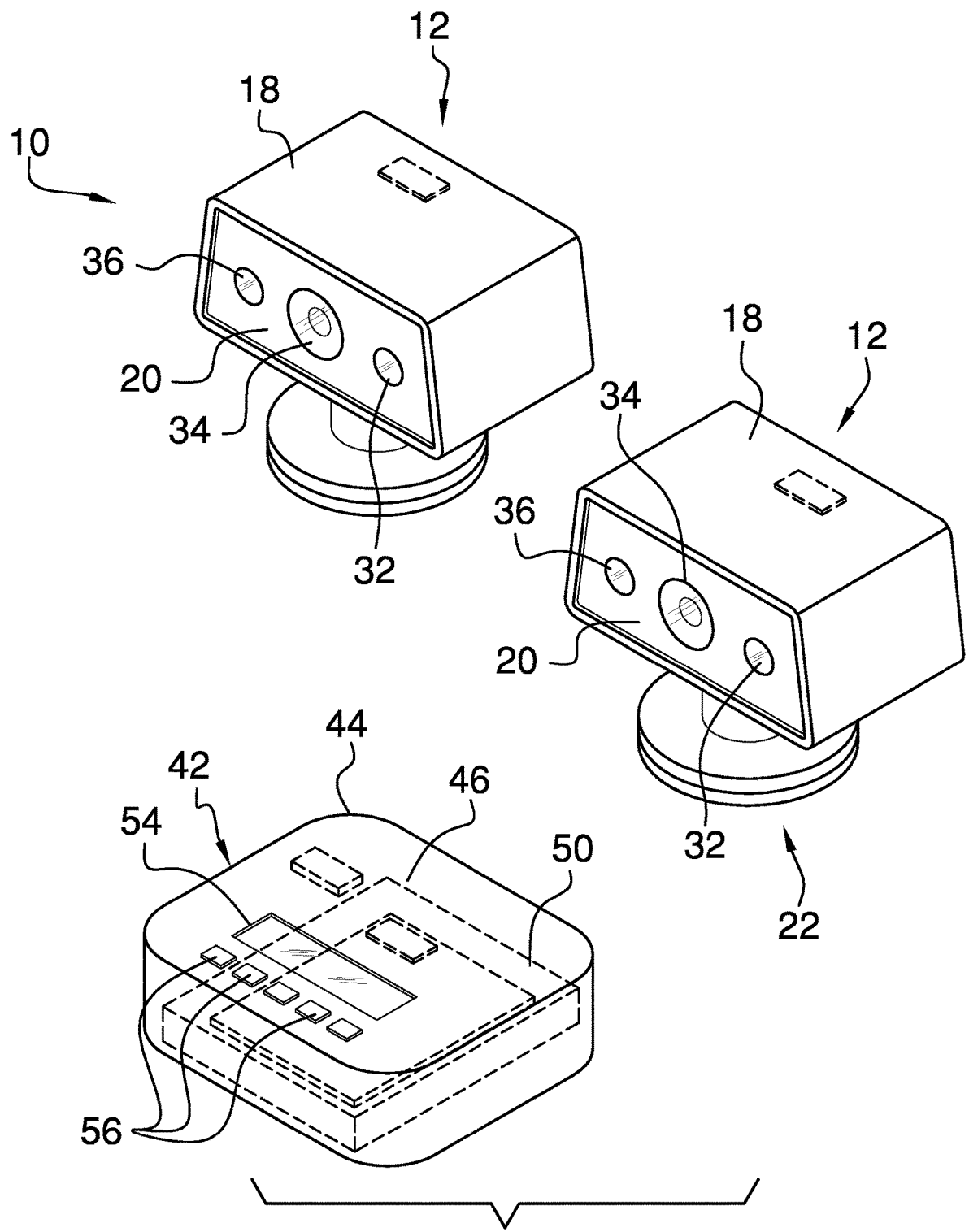
FIG. 1 is a perspective phantom view of a traffic recording assembly according to an embodiment of the disclosure.

With reference now to the drawings, and in particular to FIGS. 1 through 5 thereof, a new recording device embodying the principles and concepts of an embodiment of the disclosure and generally designated by the reference numeral 10 will be described.

As best illustrated in FIGS. 1 through 5, the traffic recording assembly 10 generally comprises a plurality of recording units 12 is provided and each of the recording units 12 is positionable on an emergency vehicle 14. Each of the recording units 12 is directed toward oncoming traffic when the emergency vehicle 14 is positioned on the side of a roadway 16 to respond to an emergency. Moreover, each of the recording units 12 has video recording capabilities to capture video of the oncoming traffic. In this way, vehicles that are not following traffic laws as they pass the emergency vehicle 14 can be identified. Additionally, each of the recording units 12 emits electromagnetic energy to detect the speed of the oncoming traffic.

Each of the recording units 12 comprises a remote housing 18 that has a front wall 20. Each of the recording units 12 includes a mount 22 comprising a first disk 24 that is rotatably positioned on a second disk 26. The first disk 24 can be coupled to an exterior surface 28 of the emergency vehicle 14. The remote housing 18 is attached to the second disk 26 such that the remote housing 18 is rotatably retained on the emergency vehicle 14. In this way the front wall 20 of the remote housing 18 can be directed toward oncoming traffic. The emergency vehicle 14 may be an ambulance, a police car, a tow truck or any other type of emergency vehicle that would commonly respond to vehicular emergencies on public roadways. Additionally, the first disk 24 may be comprised of a magnetic material such that the first disk 24 can magnetically engage the emergency vehicle 14. In this way the first disk 24 can releasably engage the emergency vehicle 14.

Each of the recording units 12 includes a remote control circuit 30 that is positioned within the remote housing 18 and the remote control circuit 30 receives an actuate input. Each of the recording units 12 includes a motion sensor 32 that is coupled to the front wall 20 of the remote housing 18. In this way the motion sensor 32 can sense motion of the oncoming traffic when the oncoming traffic moves within a pre-determined distance of the remote housing 18. The motion sensor 32 is electrically coupled to the remote control circuit 30 and the remote control circuit 30 receives the actuate input when the motion sensor 32 senses motion. The motion sensor 32 may comprise an electronic motion sensor that has an operational range of at least 100.0 feet.

Each of the recording units 12 includes a video camera 34 that is coupled to the front wall 20 of the remote housing 18 to capture video of the oncoming traffic when the remote housing 18 is directed toward the oncoming traffic. The video camera 34 is electrically coupled to the remote control circuit 30 and the video camera 34 is turned on when the remote control circuit 30 receives the actuate input. Each of the recording units 12 includes a radar emitter 36 that is coupled to the front wall 20 of the remote housing 18 and the radar emitter 36 emits the electromagnetic energy from the remote housing 18. Moreover, the radar emitter 36 receives the electromagnetic energy that is reflected from the oncoming traffic. The radar emitter 36 is electrically coupled to the remote control circuit 30 and the remote control circuit 30 determines the speed of the oncoming traffic by analyzing the electromagnetic energy that is reflected from the oncoming traffic. The electromagnetic energy emitted by the radar emitter 36 may have a frequency ranging between approximately 10.50 GHz and 10.55 GHz such as is common with police radar guns.

Each of the recording units 12 may include a transmitter 38 that is positioned in the remote housing 18. The transmitter 38 is electrically coupled to the remote control circuit 30 and the transmitter 38 broadcasts a data signal comprising video data from the video camera 34 and speed data of the oncoming traffic. The transmitter 38 may comprise a radio frequency transmitter or the like and the transmitter 38 may employ Bluetooth communication protocols. Each of the recording units 12 includes a remote power supply 40 that is positioned in the remote housing 18. The remote power supply 40 is electrically coupled to the remote control circuit 30 and the remote power supply 40 comprises at least one battery.

A base unit 42 is positioned within the emergency vehicle 14 and the base unit 42 is in remote communication with each of the recording units 12. The base unit 42 has data storage capabilities to store the video recorded by the recording units 12 and to store the speed of the oncoming traffic. In this way the base unit 42 facilitates vehicles that violate traffic laws to be identified for subsequent prosecution. The base unit 42 comprises a base housing 44 that is positioned within the emergency vehicle 14, and the base housing 44 has an outer wall 46. The base unit 42 includes a base control circuit 48 that is positioned within the base housing 44.

The base unit 42 includes an electronic memory 50 that is positioned within the base housing 44 and the electronic memory 50 is electrically coupled to the base control circuit 48. The base unit 42 includes a receiver 52 that is positioned within the base housing 44 and the receiver 52 is electrically coupled to the base control circuit 48. The receiver 52 is in wireless communication with the transmitter 38 associated with each of the recording units 12. Moreover, the transmitter 38 receives the data signal broadcast by the transmitter 38 associated with each of the recording units 12. In this way the electronic memory 50 can store the video data and the speed data for subsequent analysis. The electronic memory 50 may comprise a hard disk drive or other type of solid state electronic memory 50. Additionally, the receiver 52 may comprise a radio frequency receiver or the like and the receiver 52 may employ Bluetooth communication protocols.

The base unit 42 includes a display 54 that is coupled to the outer wall 46 such that the display 54 is visible to a user. The display 54 is electrically coupled to the base control circuit 48 and the display 54 displays indicia comprising words and letters to communicate operational parameters of the base unit 42 to facilitate the user to observe the operational parameters of the base unit 42. The display 54 may comprise an electronic display 54 such as a liquid crystal display 54 or the like. The base unit 42 includes a plurality of control buttons 56 that is each movably integrated into the base housing 44. Each of the control buttons 56 is electrically coupled to the base control circuit 48 such that each of the control buttons 56 controls respective operational parameters of the base unit 42. In this way the plurality of control buttons 56 facilitates the user to control the operational parameters of the base unit 42.

The base unit 42 includes a transceiver 58 that is positioned within the base housing 44 and the transceiver 58 is electrically coupled to the base control circuit 48. The transceiver 58 is in wireless communication with an extrinsic communication network 60 such that the transceiver 58 can to be connected to the internet. The extrinsic communication network 60 may comprise a cellular phone network, a wifi router or other means of wireless, global communication. The transceiver 58 may comprise a radio frequency transceiver or the like, the transceiver 58 may employ Bluetooth communication protocols and the transceiver 58 may employ a WPAN signal. The base unit 42 includes a base power supply 62 that is positioned within the base housing 44, the base power supply 62 is electrically coupled to the base control circuit 48 and the base power supply 62 comprises at least one battery.

Figure 2:
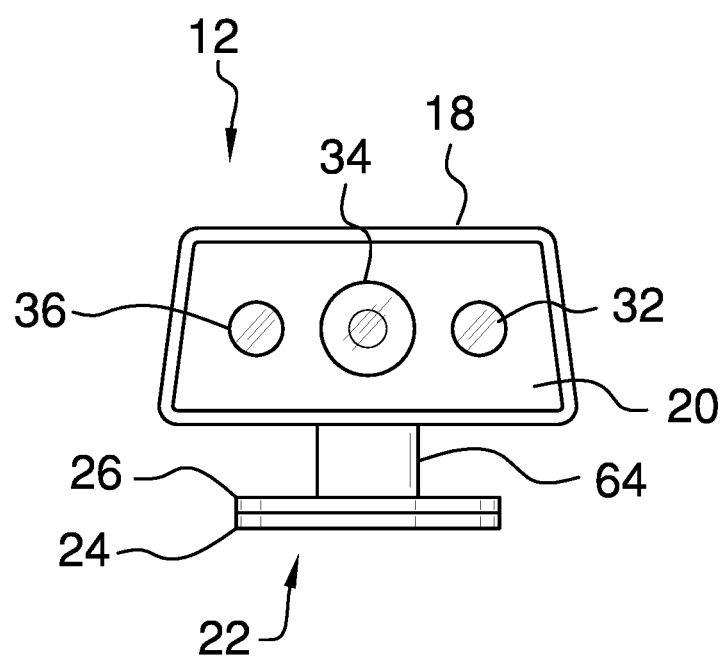
FIG. 2 is a front view of a recording unit of an embodiment of the disclosure.
Figure 3:
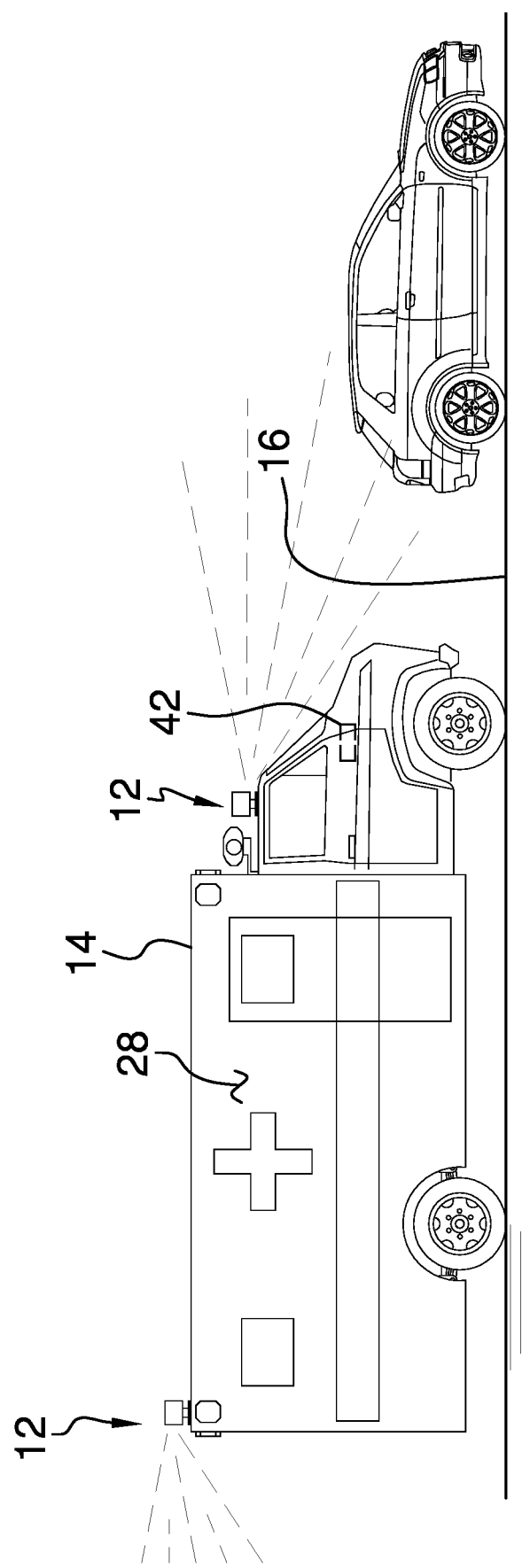
FIG. 3 is a perspective in-use view of an embodiment of the disclosure.
Figure 4:
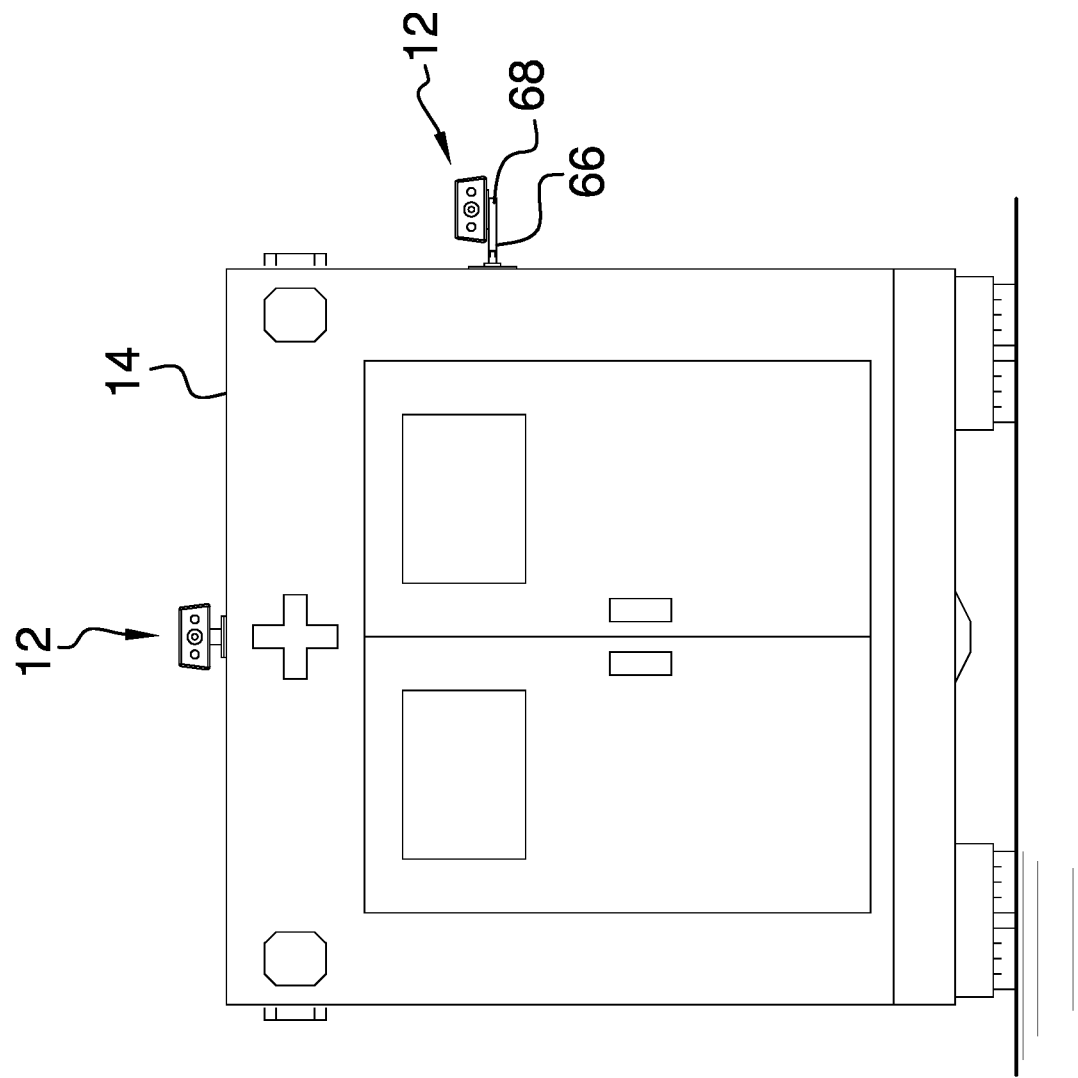
FIG. 4 is a back perspective in-use view of an embodiment of the disclosure.
Figure 5:
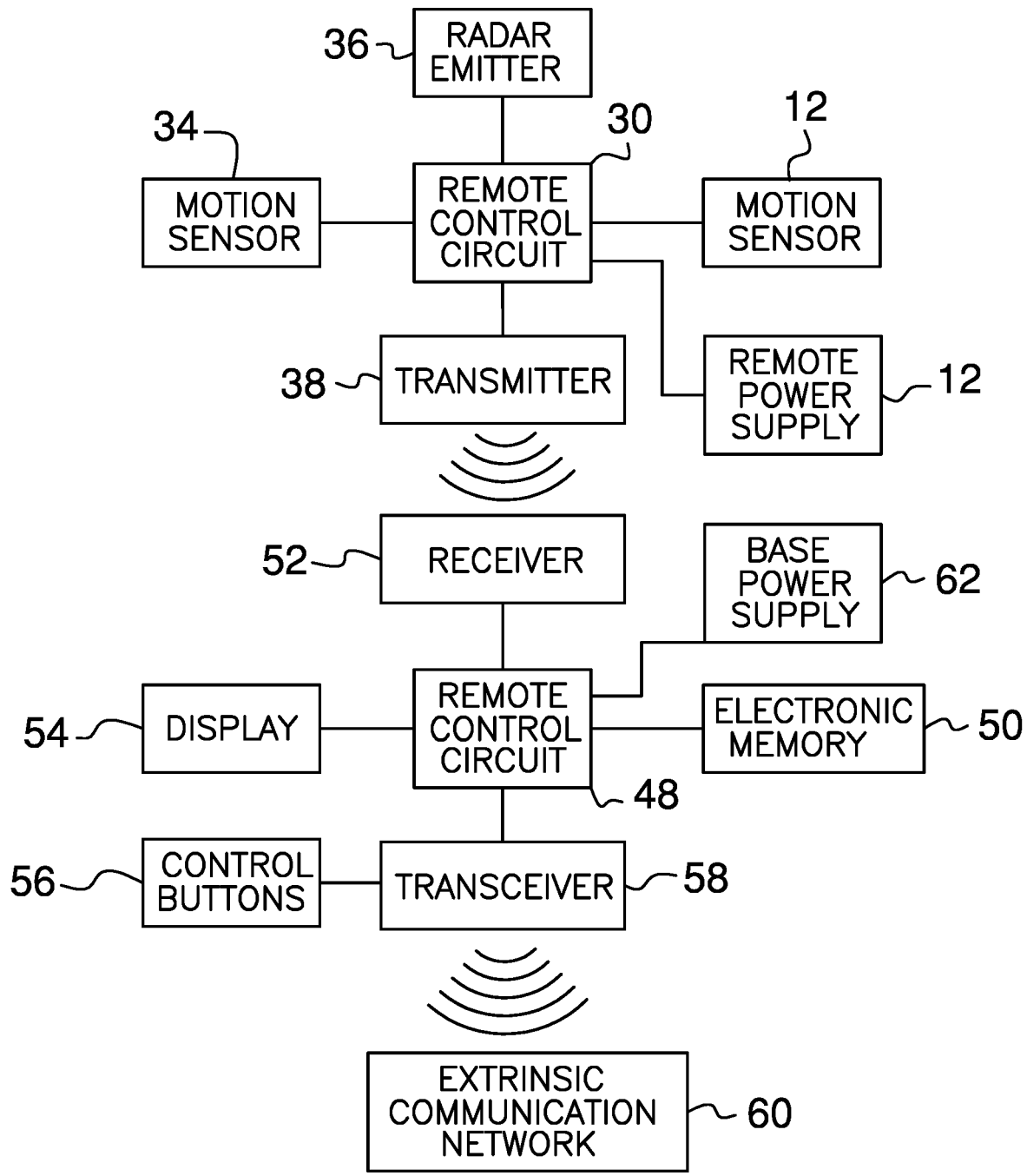
FIG. 5 is a schematic view of an embodiment of the disclosure.

As is shown in FIG. 2, mount 22 may include a stem 64 that extends between the remote housing 18 and the second disk 26. In this way the remote housing 18 can be positioned on a vertical surface of the emergency vehicle 14, such as the roof or the like. As is shown in FIG. 4, the mount 22 may include an arm 66 that extends between the remote housing 18 and the second disk 26. Additionally, the arm 66 may have an elbow 68 between the remote housing 18 and the second disk 26. In this way the remote housing 18 can be positioned on a horizontal surface of the emergency vehicle 14, such as a sidewall or the like.

In use, each of the recording units 12 is positioned at strategic locations on the emergency vehicle 14 when the emergency vehicle 14 is parked on the side of the roadway 16 to respond to a vehicular emergency. In this way the each of the recording units 12 can be directed toward oncoming traffic from both directions with respect to the emergency vehicle 14. Moreover, video footage of any vehicles that approach the emergency vehicle 14 is recorded and the speed of the vehicles is determined. In this way any vehicle that violates traffic laws when the vehicle passes the emergency vehicle 14 can be identified for subsequent prosecution.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A traffic recording assembly being mounted to an emergency vehicle while the emergency vehicle is parked on the side of a road to record vehicles that are not obeying traffic laws as they pass the emergency vehicle, said assembly comprising:
    a plurality of recording units, each of said recording units being positionable on an emergency vehicle wherein each of said recording units is configured to be directed toward oncoming traffic when the emergency vehicle is positioned on the side of a roadway to respond to an emergency, each of said recording units having video recording capabilities wherein each of said recording units is configured to capture video of the oncoming traffic thereby facilitating identification of vehicles that are not following traffic laws as they pass the emergency vehicle, each of said recording units emitting electromagnetic energy wherein each of said recording units is configured to detect the speed of the oncoming traffic; and
    a base unit being positioned within the emergency vehicle, said base unit being in remote communication with each of said recording units, said base unit having data storage capabilities to store the video recorded by said recording units and to store the speed of the oncoming traffic wherein said base unit is configured to facilitate vehicles that violate traffic laws to be identified for subsequent prosecution;
    wherein each of said recording units comprises
        a remote housing having a front wall, and
        a mount comprising a first disk being rotatably positioned on a second disk wherein said first disk is configured to be coupled to an exterior surface of the emergency vehicle, said remote housing being attached to said second disk wherein said remote housing is configured to be rotatably retained on the emergency vehicle thereby facilitating said front wall of said remote housing to be directed toward oncoming traffic; and
    wherein each of said recording units includes
        a remote control circuit being positioned within said remote housing said remote control circuit receiving an actuate input,
        a motion sensor being coupled to said front wall of said remote housing wherein said motion sensor is configured to sense motion of the oncoming traffic when the oncoming traffic moves within a pre-determined distance of said emote housing, said motion sensor being electrically coupled to said remote control circuit, said remote control circuit receiving said actuate input when said motion sensor senses motion,
        a video camera being coupled to said front wall of said remote housing wherein said video camera is configured to capture video of the oncoming traffic when said remote housing is directed toward the oncoming traffic, said video camera being electrically coupled to said remote control circuit, said video camera being turned on when said remote control circuit receives said actuate input, and
        a radar emitter being coupled to said front wall of said remote housing wherein said radar emitter is configured to emit the electromagnetic energy from said remote housing, said radar emitter receiving the electromagnetic energy that is reflected from the oncoming traffic, said radar emitter being electrically coupled to said remote control circuit wherein said remote control circuit is configured to determine the speed of the oncoming traffic by analyzing the electromagnetic energy that is reflected from the oncoming traffic.

2. The assembly according to claim 1, wherein:
    each of said remote units includes a transmitter being positioned in said remote housing, said transmitter broadcasting a data signal comprising video data and speed data; and
    said base unit comprises:
        a base housing being positioned within the emergency vehicle, said base housing having an outer wall;
        a base control circuit being positioned within said base housing;
        an electronic memory being positioned within said base housing, said electronic memory being electrically coupled to said base control circuit; and
        a receiver being positioned within said base housing, said receiver being electrically coupled to said base control circuit, said receiver being in wireless communication with said transmitter associated with each of said recording units, said transmitter receiving the data signal broadcast by said transmitter associated with each of said recording units thereby facilitating said electronic memory to store the video data and the speed data for subsequent analysis.

3. The assembly according to claim 2, wherein said base unit includes:
    a display being coupled to said outer wall wherein said display is configured to be visible to a user, said display being electrically coupled to said base control circuit, said display displaying indicia comprising words and letters comprising operational parameters of said base unit wherein said display is configured to facilitate the user to observe the operational parameters of said base unit; and a plurality of control buttons, each of said control buttons being movably integrated into said base housing, each of said control buttons being electrically coupled to said base control circuit such that each of said control buttons controls respective operational parameters of said base unit wherein said plurality of control buttons is configured to facilitate the user to control the operational parameters of said base unit.

4. The assembly according to claim 2, wherein said base unit includes a transceiver being positioned within said base housing, said transceiver being electrically coupled to said base control circuit, said transceiver being in wireless communication with an extrinsic communication network wherein said transceiver is configured to be connected to the Internet.

5. A traffic recording assembly being mounted to an emergency vehicle while the emergency vehicle is parked on the side of a road to record vehicles that are not obeying traffic laws as they pass the emergency vehicle, said assembly comprising:

a plurality of recording units, each of said recording units being positionable on an emergency vehicle wherein each of said recording units is configured to be directed toward oncoming traffic when the emergency vehicle is positioned on the side of a roadway to respond to an emergency, each of said recording units having video recording capabilities wherein each of said recording units is configured to capture video of the oncoming traffic thereby facilitating identification of vehicles that are not following traffic laws as they pass the emergency vehicle, each of said recording units emitting electromagnetic energy wherein each of said recording units is configured to detect the speed of the oncoming traffic, each of said recording units comprising:

a remote housing having a front wall;

a mount comprising a first disk being rotatably positioned on a second disk wherein said first disk is configured to be coupled to an exterior surface of the emergency vehicle, said remote housing being attached to said second disk wherein said remote housing is configured to be rotatably retained on the emergency vehicle thereby facilitating said front wall of said remote housing to be directed toward oncoming traffic;

a remote control circuit being positioned within said remote housing, said remote control circuit receiving an actuate input;

a motion sensor being coupled to said front wall of said remote housing wherein said motion sensor is configured to sense motion of the oncoming traffic when the oncoming traffic moves within a pre-determined distance of said remote housing, said motion sensor being electrically coupled to said remote control circuit, said remote control circuit receiving said actuate input when said motion sensor senses motion;

a video camera being coupled to said front wall of said remote housing wherein said video camera is configured to capture video of the oncoming traffic when said remote housing is directed toward the oncoming traffic, said video camera being electrically coupled to said remote control circuit, said video camera being turned on when said remote control circuit receives said actuate input;

a radar emitter being coupled to said front wall of said remote housing wherein said radar emitter is configured to emit the electromagnetic energy from said remote housing, said radar emitter receiving the electromagnetic energy that is reflected from the oncoming traffic, said radar emitter being electrically coupled to said remote control circuit wherein said remote control circuit is configured to determine the speed of the oncoming traffic by analyzing the electromagnetic energy that is reflected from the oncoming traffic;

a transmitter being positioned in said remote housing, said transmitter being electrically coupled to said remote control circuit, said transmitter broadcasting a data signal comprising video data from said video camera and speed data of the oncoming traffic; and a remote power supply being positioned in said remote housing, said remote power supply being electrically coupled to said remote control circuit, said remote power supply comprising at least one battery; and a base unit being positioned within the emergency vehicle, said base unit being in remote communication with each of said recording units, said base unit having data storage capabilities to store the video recorded by said recording units and to store the speed of the oncoming traffic wherein said base unit is configured to facilitate vehicles that violate traffic laws to be identified for subsequent prosecution, said base unit comprising:

a base housing being positioned within the emergency vehicle, said base housing having an outer wall;

a base control circuit being positioned within said base housing;

an electronic memory being positioned within said base housing, said electronic memory being electrically coupled to said base control circuit;

a receiver being positioned within said base housing, said receiver being electrically coupled to said base control circuit, said receiver being in wireless communication with said transmitter associated with each of said recording units, said transmitter receiving the data signal broadcast by said transmitter associated with each of said recording units thereby facilitating said electronic memory to store the video data and the speed data for subsequent analysis;

a display being coupled to said outer wall wherein said display is configured to be visible to a user, said display being electrically coupled to said base control circuit, said display displaying indicia comprising words and letters comprising operational parameters of said base unit wherein said display is configured to facilitate the user to observe the operational parameters of said base unit;

a plurality of control buttons, each of said control buttons being movably integrated into said base housing, each of said control buttons being electrically coupled to said base control circuit such that each of said control buttons controls respective operational parameters of said base unit wherein said plurality of control buttons is configured to facilitate the user to control the operational parameters of said base unit;

a transceiver being positioned within said base housing, said transceiver being electrically coupled to said base control circuit, said transceiver being in wireless communication with an extrinsic communication network wherein said transceiver is configured to be connected to the internet; and a base power supply being positioned within said base housing, said base power supply being electrically coupled to said base control circuit, said base power supply comprising at least one battery.

\* \* \* \* \*